(12) United States Patent
Calvin (10) Patent No.: US 7,797,724 B2
(45) Date of Patent: Sep. 14, 2010

(54) METHODS AND APPARATUS FOR SECURE ONLINE ACCESS ON A CLIENT DEVICE

(75) Inventor: Phil Calvin, Vancouver (CA)

(73) Assignee: Citrix Systems, Inc., Fort Lauderdale, FL (US)

( * ) Notice: Subject to any disclaimer, the term of this patent is extended or adjusted under 35 U.S.C. 154(b) by 1623 days.

(21) Appl. No.: 10/931,405

(22) Filed: Aug. 31, 2004

(65) Prior Publication Data

US 2006/0047956 A1    Mar. 2, 2006

(51) Int. Cl.
G06F 17/00 (2006.01)
(52) U.S. Cl. ......................................... 726/1
(58) Field of Classification Search ................ 726/1
See application file for complete search history.

(56) References Cited

U.S. PATENT DOCUMENTS

| | | | |
|---|---|---|---|
| 5,062,060 A | 10/1991 | Kolnick | |
| 5,241,625 A | 8/1993 | Epard et al. | |
| 5,491,808 A | 2/1996 | Geist, Jr. | |
| 5,606,493 A | 2/1997 | Duscher et al. | |
| 5,734,853 A * | 3/1998 | Hendricks et al. ........... | 715/716 |
| 5,812,668 A | 9/1998 | Weber | |
| 5,850,446 A | 12/1998 | Berger et al. | |
| 5,860,073 A | 1/1999 | Ferrel et al. | |
| 5,870,559 A | 2/1999 | Leshem et al. | |
| 5,889,863 A | 3/1999 | Weber | |
| 5,907,704 A | 5/1999 | Gudmundson et al. | |
| 5,931,917 A | 8/1999 | Nguyen et al. | |
| 5,943,424 A | 8/1999 | Berger et al. | |
| 5,958,008 A | 9/1999 | Pogrebisky et al. | |
| 5,978,840 A | 11/1999 | Nguyen et al. | |
| 5,983,208 A | 11/1999 | Haller et al. | |
| 5,987,132 A | 11/1999 | Rowney | |
| 6,002,767 A | 12/1999 | Kramer | |
| 6,026,379 A | 2/2000 | Haller et al. | |
| 6,072,870 A | 6/2000 | Nguyen et al. | |
| 6,108,662 A | 8/2000 | Hoskins et al. | |
| 6,119,105 A | 9/2000 | Williams | |
| 6,144,962 A | 11/2000 | Weinberg et al. | |
| 6,157,864 A | 12/2000 | Schwenke et al. | |
| 6,157,935 A | 12/2000 | Tran et al. | |
| 6,161,051 A | 12/2000 | Hafemann et al. | |
| 6,163,772 A | 12/2000 | Kramer et al. | |
| 6,167,406 A | 12/2000 | Hoskins et al. | |
| 6,178,409 B1 | 1/2001 | Weber et al. | |
| 6,199,082 B1 | 3/2001 | Ferrel et al. | |
| 6,202,060 B1 | 3/2001 | Tran | |
| 6,219,669 B1 | 4/2001 | Haff et al. | |
| 6,230,173 B1 | 5/2001 | Ferrel et al. | |
| 6,237,006 B1 | 5/2001 | Weinberg et al. | |
| 6,253,027 B1 | 6/2001 | Weber et al. | |
| 6,253,326 B1 | 6/2001 | Lincke et al. | |
| 6,268,853 B1 | 7/2001 | Hoskins et al. | |
| 6,289,382 B1 | 9/2001 | Bowman-Amuah | |
| 6,304,915 B1 | 10/2001 | Nguyen et al. | |
| 6,308,273 B1 | 10/2001 | Goertzel et al. | |
| 6,314,406 B1 | 11/2001 | O'Hagan et al. | |
| 6,324,525 B1 | 11/2001 | Kramer et al. | |
| 6,332,163 B1 | 12/2001 | Bowman-Amuah | |
| 6,339,832 B1 | 1/2002 | Bowman-Amuah | |
| 6,341,310 B1 | 1/2002 | Leshem et al. | |
| 6,345,239 B1 | 2/2002 | Bowman-Amuah | |
| 6,356,437 B1 | 3/2002 | Mitchell et al. | |
| 6,363,363 B1 | 3/2002 | Haller et al. | |
| 6,373,950 B1 | 4/2002 | Rowney | |
| 6,397,259 B1 | 5/2002 | Lincke et al. | |
| 6,405,192 B1 | 6/2002 | Brown et al. | |
| 6,427,132 B1 | 7/2002 | Bowman-Amuah | |
| 6,430,567 B2 | 8/2002 | Burridge | |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |
| 6,442,571 B1 | 8/2002 | Haff et al. | |
| 6,442,748 B1 | 8/2002 | Bowman-Amuah | |
| 6,466,654 B1 | 10/2002 | Cooper et al. | |
| 6,470,383 B1 | 10/2002 | Leshem et al. | |
| 6,473,794 B1 | 10/2002 | Guheen et al. | |
| 6,477,580 B1 | 11/2002 | Bowman-Amuah | |
| 6,477,665 B1 | 11/2002 | Bowman-Amuah | |
| 6,496,850 B1 | 12/2002 | Bowman-Amuah | |

(Continued)

FOREIGN PATENT DOCUMENTS

EP    1187022    3/2002

(Continued)

*Primary Examiner*—Jacob Lipman
(74) *Attorney, Agent, or Firm*—Choate Hall & Stewart LLP; John D. Lanza (57) ABSTRACT

A method of securely accessing at a client device content from a server without using the non-volatile memory of the client device is disclosed. The bypassing of non-volatile memory lessens the security risk of unauthorized viewing of the server originated content. An transport mechanism is initiated on a client device and creates a document container. Downloaded documents from a server are mapped into the document container and saved within the document container in volatile memory. Substitute menus are generated within the container to replace application menus. User documents are saved directly to the originating server via the substitute menus. The downloaded copies in volatile memory automatically delete when the document container is destroyed thereby reducing security concerns of unauthorized viewing of the content at the client device.

25 Claims, 9 Drawing Sheets

U.S. PATENT DOCUMENTS

| | | |
|---|---|---|
| 6,502,102 B1 | 12/2002 | Haswell et al. |
| 6,502,135 B1 | 12/2002 | Munger et al. |
| 6,502,213 B1 | 12/2002 | Bowman-Amuah |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,556,950 B1 | 4/2003 | Schwenke et al. |
| 6,567,813 B1 | 5/2003 | Zhu et al. |
| 6,571,282 B1 | 5/2003 | Bowman-Amuah |
| 6,574,672 B1 | 6/2003 | Mitchell et al. |
| 6,578,068 B1 | 6/2003 | Bowman-Amuah |
| 6,584,480 B1 | 6/2003 | Ferrel et al. |
| 6,590,588 B2 | 7/2003 | Lincke et al. |
| 6,595,417 B2 | 7/2003 | O'Hagan et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,611,867 B1 | 8/2003 | Bowman-Amuah |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,761 B2 | 9/2003 | Munger et al. |
| 6,633,742 B1 | 10/2003 | Turner et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,671,818 B1 | 12/2003 | Mikurak |
| 6,697,894 B1 | 2/2004 | Mitchell et al. |
| 6,701,514 B1 | 3/2004 | Haswell et al. |
| 6,704,873 B1 | 3/2004 | Underwood |
| 6,715,145 B1 | 3/2004 | Bowman-Amuah |
| 6,718,535 B1 | 4/2004 | Underwood |
| 6,721,713 B1 | 4/2004 | Guheen et al. |
| 6,725,421 B1 | 4/2004 | Boucher et al. |
| 6,742,015 B1 | 5/2004 | Bowman-Amuah |
| 6,757,362 B1 | 6/2004 | Cooper et al. |
| 6,816,904 B1 | 11/2004 | Ludwig et al. |
| 6,820,111 B1 | 11/2004 | Rubin et al. |
| 6,826,616 B2 | 11/2004 | Larson et al. |
| 6,831,682 B1 | 12/2004 | Silverbrook et al. |
| 6,834,310 B2 | 12/2004 | Munger et al. |
| 6,839,759 B2 | 1/2005 | Larson et al. |
| 6,842,906 B1 | 1/2005 | Bowman-Amuah |
| 6,845,383 B1 | 1/2005 | Kraenzel et al. |
| 6,850,252 B1 | 2/2005 | Hoffberg |
| 6,862,553 B2 | 3/2005 | Schwenke et al. |
| 6,871,346 B1 | 3/2005 | Kumbalimutt et al. |
| 6,885,920 B2 | 4/2005 | Yakes et al. |
| 6,904,449 B1 | 6/2005 | Quinones |
| 6,907,473 B2 | 6/2005 | Schmidt et al. |
| 6,907,546 B1 | 6/2005 | Haswell et al. |
| 6,918,113 B2 | 7/2005 | Patel et al. |
| 6,938,079 B1 | 8/2005 | Anderson et al. |
| 6,950,991 B2 | 9/2005 | Bloomfield et al. |
| 6,957,186 B1 | 10/2005 | Guheen et al. |
| 6,980,962 B1 | 12/2005 | Arganbright et al. |
| 6,990,480 B1 | 1/2006 | Burt |
| 6,993,421 B2 | 1/2006 | Pillar et al. |
| 6,993,456 B2 | 1/2006 | Brooks et al. |
| 7,023,979 B1 | 4/2006 | Wu et al. |
| 7,025,209 B2 | 4/2006 | Hawkins |
| 7,030,890 B1 | 4/2006 | Jouet et al. |
| 7,051,316 B2 | 5/2006 | Charisius et al. |
| 7,070,110 B2 | 7/2006 | Lapstun et al. |
| 7,076,738 B2 | 7/2006 | Baker et al. |
| 7,097,106 B2 | 8/2006 | Silverbrook et al. |
| 7,100,195 B1 | 8/2006 | Underwood |
| 7,117,504 B2 | 10/2006 | Smith et al. |
| 7,120,690 B1 | 10/2006 | Krishnan et al. |
| 7,124,101 B1 | 10/2006 | Mikurak |
| 7,128,265 B2 | 10/2006 | Silverbrook et al. |
| 7,128,270 B2 | 10/2006 | Silverbrook et al. |
| 7,130,807 B1 | 10/2006 | Mikurak |
| 7,131,596 B2 | 11/2006 | Lapstun et al. |
| 7,137,566 B2 | 11/2006 | Silverbrook et al. |
| 7,149,698 B2 | 12/2006 | Guheen et al. |
| 7,150,398 B2 | 12/2006 | Silverbrook et al. |
| 7,156,289 B2 | 1/2007 | Silverbrook et al. |
| 7,159,777 B2 | 1/2007 | Silverbrook et al. |
| 7,165,041 B1 | 1/2007 | Guheen et al. |
| 7,174,286 B2 | 2/2007 | Martin et al. |
| 7,175,089 B2 | 2/2007 | Silverbrook et al. |
| 7,178,129 B2 | 2/2007 | Katz |
| 7,178,718 B2 | 2/2007 | Silverbrook et al. |
| 7,178,719 B2 | 2/2007 | Silverbrook et al. |
| 7,184,866 B2 | 2/2007 | Squires et al. |
| 7,185,274 B1 | 2/2007 | Rubin et al. |
| 7,188,180 B2 | 3/2007 | Larson et al. |
| 7,188,769 B2 | 3/2007 | Silverbrook et al. |
| 7,197,374 B2 | 3/2007 | Silverbrook et al. |
| 7,207,483 B2 | 4/2007 | Silverbrook et al. |
| 7,207,485 B2 | 4/2007 | Silverbrook et al. |
| 7,225,979 B2 | 6/2007 | Silverbrook et al. |
| 2002/0049608 A1 | 4/2002 | Hartsell et al. |
| 2002/0049841 A1 | 4/2002 | Johnson et al. |
| 2002/0059274 A1 | 5/2002 | Hartsell et al. |
| 2002/0065864 A1 | 5/2002 | Hartsell et al. |
| 2002/0083183 A1 | 6/2002 | Pujare et al. |
| 2002/0129164 A1 | 9/2002 | Van Der Meulen et al. |
| 2002/0174227 A1 | 11/2002 | Hartsell et al. |
| 2002/0184224 A1 | 12/2002 | Haff et al. |
| 2003/0009538 A1 | 1/2003 | Shah et al. |
| 2003/0046586 A1 | 3/2003 | Bheemarasetti et al. |
| 2003/0046587 A1 | 3/2003 | Bheemarasetti et al. |
| 2003/0063119 A1 | 4/2003 | Bloomfield et al. |
| 2003/0167301 A1 | 9/2003 | Zhu et al. |
| 2003/0167302 A1 | 9/2003 | Zhu et al. |
| 2003/0167303 A1 | 9/2003 | Zhu et al. |
| 2003/0167304 A1 | 9/2003 | Zhu et al. |
| 2003/0167305 A1 | 9/2003 | Zhu et al. |
| 2003/0167339 A1 | 9/2003 | Zhu et al. |
| 2003/0167418 A1 | 9/2003 | Zhu et al. |
| 2004/0031058 A1 | 2/2004 | Reisman |
| 2004/0049515 A1 | 3/2004 | Haff et al. |
| 2004/0190092 A1 | 9/2004 | Silverbrook et al. |
| 2005/0149726 A1 | 7/2005 | Joshi et al. |
| 2005/0262357 A1 | 11/2005 | Araujo et al. |

FOREIGN PATENT DOCUMENTS

| | | |
|---|---|---|
| EP | 1198122 | 4/2002 |
| EP | 1376927 | 1/2004 |
| WO | WO-9858478 | 12/1998 |

* cited by examiner

*Fig. 1*

(Prior Art)

METHODS AND APPARATUS FOR SECURE ONLINE ACCESS ON A CLIENT DEVICE

FIELD OF THE INVENTION

The present invention relates generally to securely accessing content files from a server, and more particularly, to securely accessing content files from a server system without storing the content files in non-volatile memory on a client device.

BACKGROUND OF THE INVENTION

Conventionally, users on a client system have used a combination of a web browser and other client-based applications to access a content file retrieved from a remote location. For example, the user may access Internet content using INTERNET EXPLORER from Microsoft Corporation of Redmond, Wash. and then use WINDOWS EXPLORER also from Microsoft Corporation to access a desktop productivity document type such as a WORD document that has been downloaded to a local location.

Figure 1:
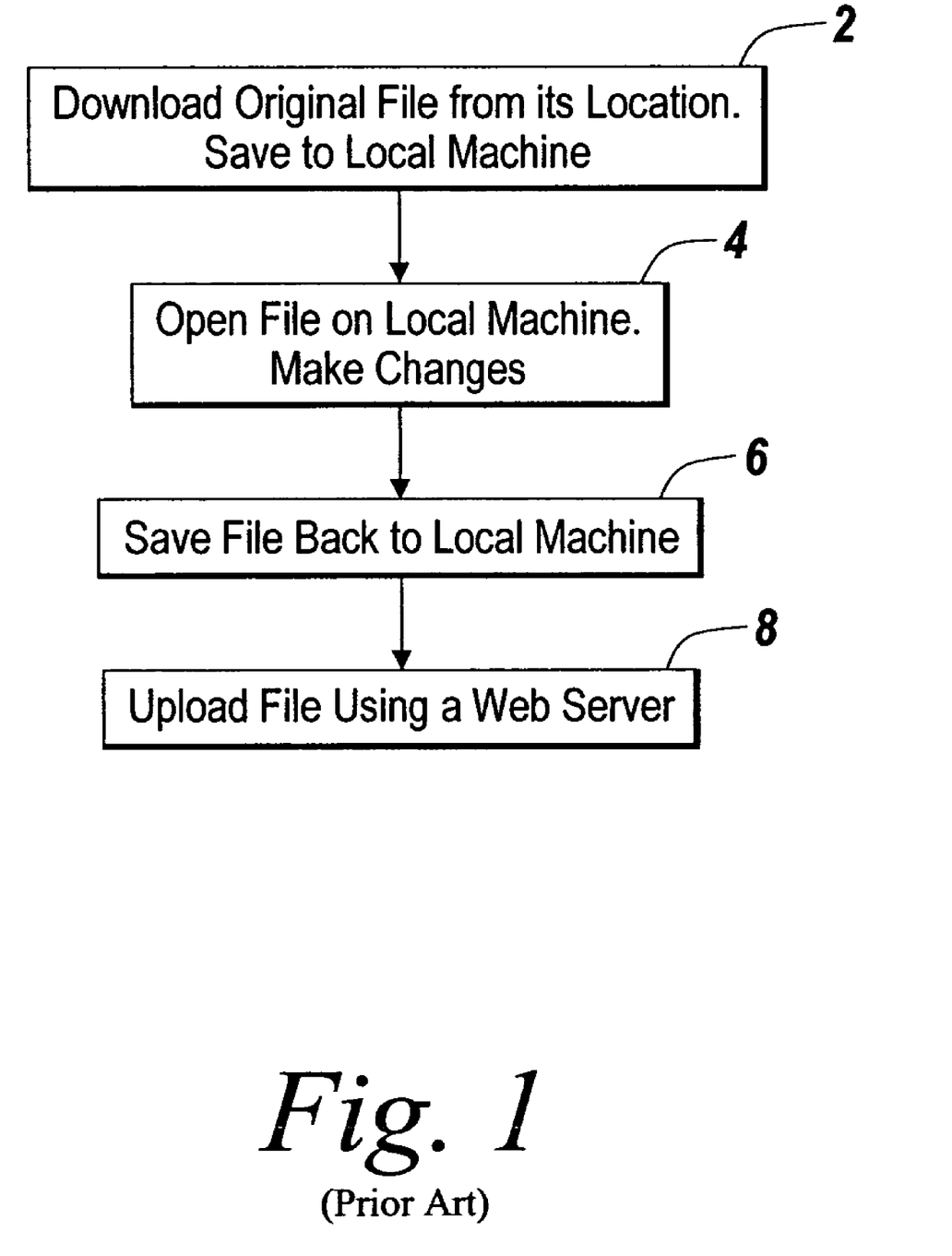
FIG. 1 (prior art) depicts the conventional sequence of steps followed at a client device to edit and save content that is retrieved from a server.

The conventional process of accessing and retrieving the remotely located content and then editing the content file locally is shown in FIG. 1. The sequence of steps followed to conventionally edit the downloaded content files begins by downloading the original file from its location and saving it to a local machine (step 2). The user then opens the file on the local machine, views the file and makes any desired changes (step 4), either by using a file manager which accesses the document and calls a associated application (e.g.: user accesses file with WINDOWS EXPLORER and selects a file which calls WORD from Microsoft Corporation to open a file with a .doc extension) or by opening an application such as WORD and then directly accessing the saved document with the application, such as by using the open command on the file menu. When the user is viewing or editing the document, the document is saved back to the local machine (step 6). The file may then be uploaded to a web server using the client browser (step 8).

Unfortunately, this conventional sequence of downloading-editing-storing and uploading presents difficulties from a security standpoint. In order to access the content at the client, the user is required to twice save the content locally to non-volatile memory. The first save is required during download and the second is required post editing prior to the uploading process. Additionally, many users frequently move and/or copy the downloaded content from one local directory to another (e.g.: from dir://downloaded_files to dir://my_documents). Each of these save actions creates a local copy of the document on the client. Very few users of the client device will remember to manually delete these local copies of the documents which accordingly remain on the client device.

Direct manipulation of the client device's storage may be inaccessible to the user, such as the situation where the client device is located in a public kiosk setting. In these cases, the option of deleting the local copy is not available to the user. Since documents left on the client may be accessed by unauthorized individuals with access to the client machine this presents a significant security issue.

SUMMARY OF THE INVENTION

The illustrative embodiment of the present invention provides a method of containing and controlling the distribution of confidential information from a server. By creating a mechanism to control the viewing, editing and storing of content files at the client device, the present invention enables secure online access to documents that helps prevent unwanted disclosure of confidential information. Rule-based policies may be implemented to prevent the storage of content files on the client device thereby preventing copies of stored content files from being accidentally left on the client device. The rule-based policies may also be used to prevent or modify the type of content accessible to the user in addition to limiting the manipulation of the content at the client device. The present invention also allows the tailoring of an appropriate level of output from a server to a requesting client.

The illustrative embodiment of the present invention provides a method of securely accessing at a client device content from a server without using the non-volatile memory of the client device. Bypassing non-volatile memory lessens the security risk of unauthorized viewing, editing or acquisition of the server-originated content. A transport mechanism is initiated on a client device and creates a document container on the client device. Documents from the server are mapped into the document container and saved in volatile memory allocated to the document container. Substitute menus are generated within the container to replace the usual menus of the applications used to access and/or edit the content files. User documents are saved directly to the originating server via the substitute menus. The downloaded content in volatile memory automatically delete when the document container is destroyed thereby reducing security concerns regarding unauthorized viewing of the content at the client device.

In one embodiment, a method for securely providing access to a content file includes the step of requesting access to a content file and receiving from the server the requested file. The method further includes storing the received content file in a volatile memory element. The method also invokes an application program associated with the content file. A set of replacement menu commands for interacting with the application program are provided. The set of replacement menu commands are consistent with a set of menu commands associated with the invoked application program.

In another embodiment, an apparatus for securely providing access to a content file includes a file transport mechanism. The apparatus also includes a storage buffer created by the transport mechanism in a volatile memory element. The file transport mechanism stores a received content file in the storage buffer. The apparatus further includes a document container that is invoked by and in communication with the file transport mechanism. The document container provides a context for execution of an application program associated with the content file. The document container provides a set of replacement menu commands for interacting with the application program. The set of replacement menu commands are consistent with a set of menu commands associated with the invoked application program.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION

The illustrative embodiment of the present invention allows the distribution of content files from a server to a client for viewing or editing locally that controls the ability of a user at the client to edit and save the content locally. By bypassing non-volatile memory on the client device in favor of volatile memory assigned to an instantiated document container object, the risk of extra copies of the content being saved on the client device is greatly lessened. Additionally, the ability to perform menu substitution for the client-side applications executing within the instantiated document container allows control over the editing process. To increase security, the content distribution system can also employ a filtering process at a proxy server to apply a rules-based filter to content requests prior to delivering the content to the document container on the client device.

The illustrative embodiment of the present invention is applicable to a distributed networking environment where a remote user requests access to content. Prior to discussing the specifics of the present invention, it may be helpful to discuss some of the network environments in which the illustrative embodiment of the present invention may be employed.

Figure 2:
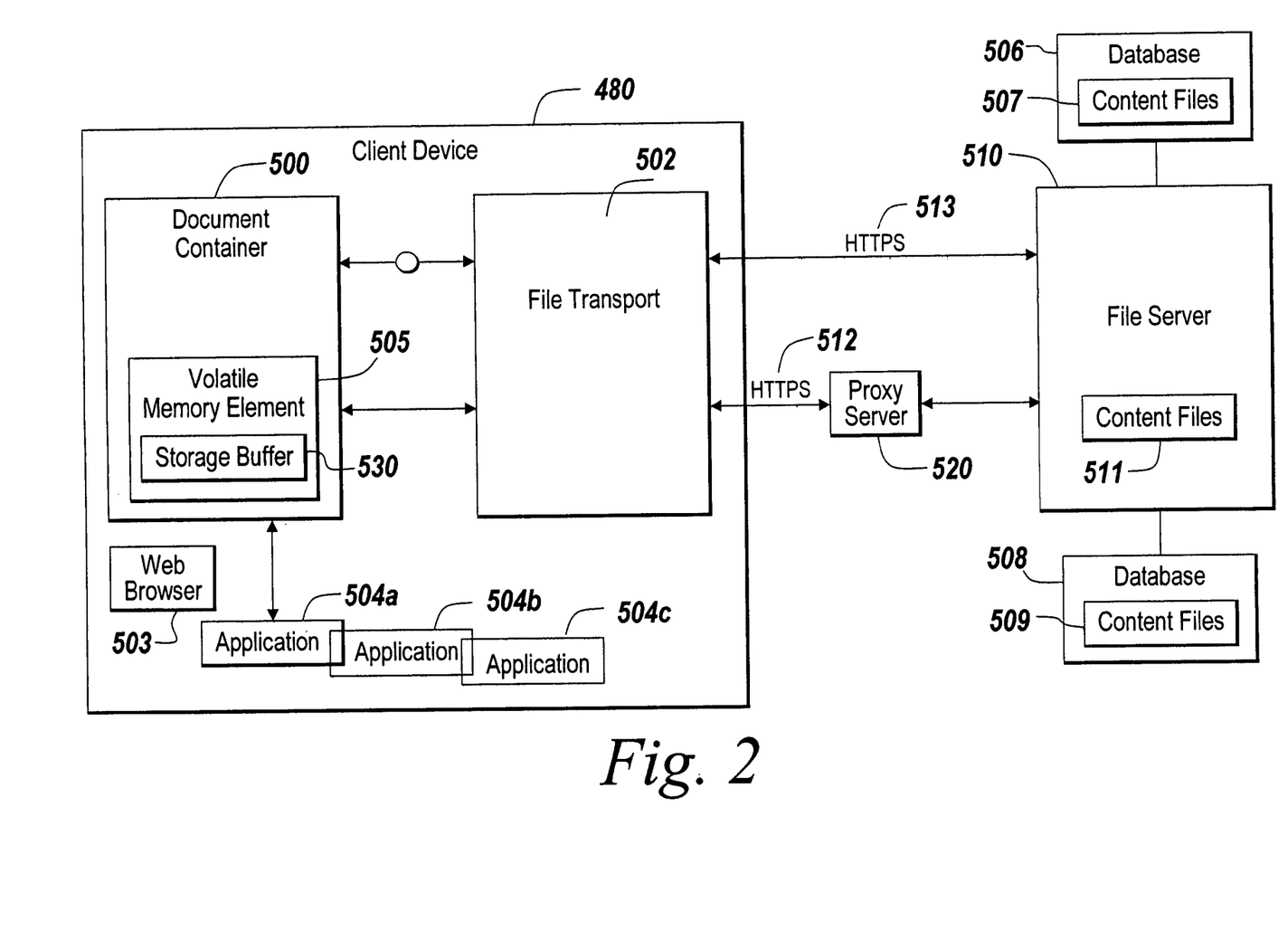
FIG. 2 is a block diagram of an embodiment of an environment suitable for practicing the illustrative embodiment of the present invention.

FIG. 2 is a block diagram of an environment suitable for practicing the illustrative embodiment of the present invention. A client device 480 includes a web browser 503 and application programs 504a, 504b . . . 504n. An application program is any program that processes data to provide output and that uses an operating system for access to system resources. Exemplary application programs include: word processing applications, such as MICROSOFT WORD, manufactured by Microsoft Corporation of Redmond, Wash.; spreadsheet programs, such as MICROSOFT EXCEL, manufactured by Microsoft Corporation; electronic mail programs, such as MICROSOFT OUTLOOK, manufactured by Microsoft Corporation and GROUPWISE, manufactured by Novell Corp. of Provo, Utah; and productivity suites such as STAR OFFICE, manufactured by Sun Microsystems of Mountain View, Calif.

A file server 510 includes content files 511 and may be connected to databases 506 and 508 holding additional content files 507 and 509 respectively. Those skilled in the art will recognize that other network storage devices or document repositories holding content files may also be networked to the file server 510 without departing from the scope of the present invention. A user of the client device 480 may request content from the file server 510 using the web browser 503 to send a request such as the depicted Hypertext Transport Protocol Secure (HTTPS) request 513, or an HTTP (Hypertext Transport Protocol) or FTP (File Transport Protocol) request. The selection of the resource causes the creation of a transport mechanism such as an Active X transport control 502 on the client device 480. An Active X control is a specialized COM (Component Object Model) object that implements a set of interfaces that enable it to look and act like a control. Alternatively, the transport mechanism may be a dynamically linked library (.dll).

The transport control 502 creates an instance of a document container 500 on the client device such as an Active X document container. The Active X document container 500 is a window hosting the Active X transport control 502 which is used to retrieve the requested content 507, 509, and 511 from the file server 510. Those skilled in the art will recognize that other types of containers, such as a JAVA-based container may also be used to create the document container. The Active X document container 500 is associated with a storage buffer 530 created in a volatile memory element 505. The storage buffer 530 is used to hold content files 507, 509 and 511 requested from the file server. As set forth further below, the storage buffer 530 may be a Win32 mapping object. Since the content files 507, 509 and 511 are stored in the storage buffer 530 in the volatile memory element 505, once the memory holding the content file in the volatile storage element is released, the content file ceases to exist on the client device. The client device 480 may also send the request for a content file via a proxy server 520 (such as via the depicted HTTPS connection 512). The proxy server 520 may filter the request prior based on pre-determined rules prior to delivering any content to the client device 480. Those skilled in the art will recognize that the requested content may be stored on the file server 510 such as file content 511 or may be located at another location accessible to the file server such as database 506 and 508. The creation of the document container 500 and the mapping of the content file to the document container is discussed further below in relation to FIG. 4.

Figure 3A:
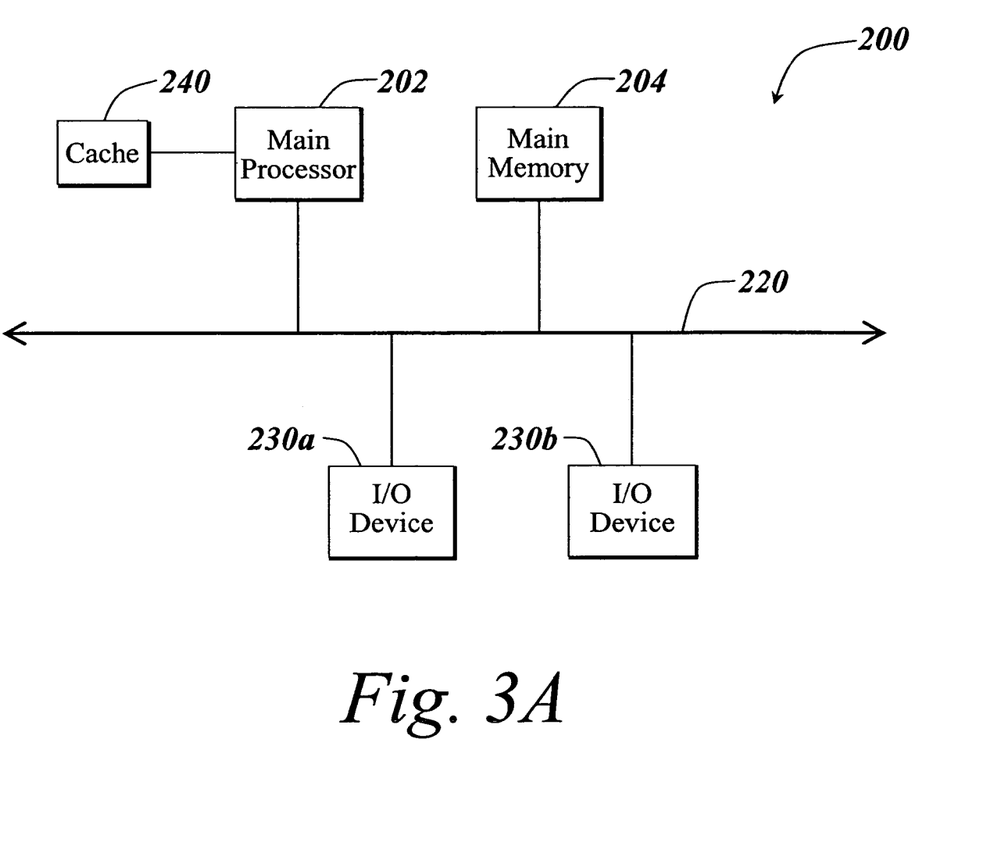
FIGS. 3A and 3B are block diagrams depicting embodiments of computers useful in connection with the present invention.
Figure 3B:
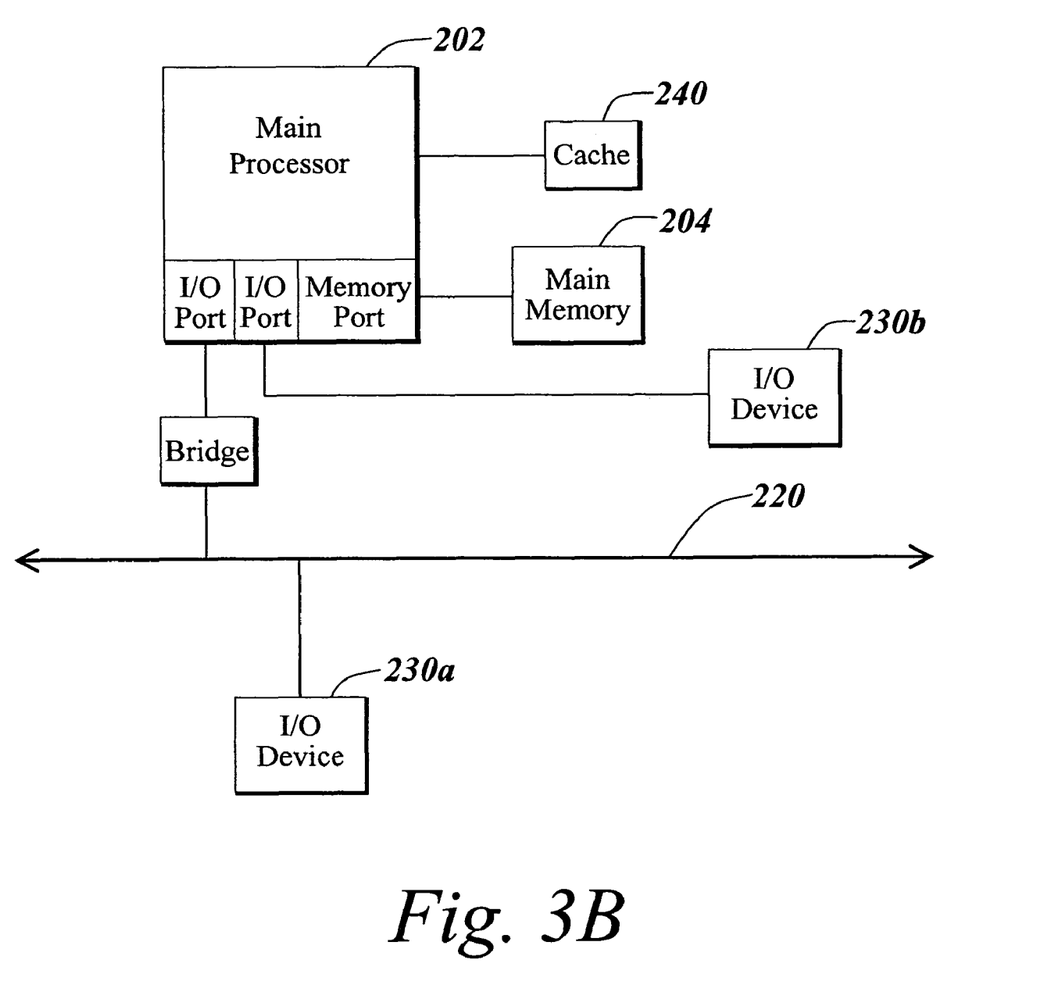

In many embodiments, the file server 510, client device 480 and the proxy server 520 are provided as personal computer or computer servers, of the sort manufactured by the Hewlett-Packard Corporation of Palo Alto, Calif. or the Dell Corporation of Round Rock, Tex. FIGS. 3A and 3B depict block diagrams of a typical computer 200 useful as the file server 510, the proxy server 520, or the client device 480 in those embodiments. As shown in FIGS. 3A and 3B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athalon 64 FX, the AMD Athalon, or the AMD Duron processor, manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 3A, the processor 202 communicates with main memory 204 via a system bus 220 (described in more detail below). FIG. 3B depicts an embodiment of a computer system 200 in which the processor communicates directly with main memory 204 via a memory port. For example, in FIG. 3B the main memory 204 may be DRDRAM.

FIGS. 3A and 3B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 3A, the processor 202 communicates with various I/O devices 230 via a local system bus 220. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 202 may use an Advanced Graphics Port (AGP) to communicate with the display. FIG. 3B depicts an embodiment of a computer system 200 in which the main processor 202 communicates directly with I/O device 230b via HyperTransport, Rapid I/O, or InfiniBand. FIG. 3B also depicts an embodiment in which local busses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIGS. 3A and 3B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments in which the client device 480 is a mobile device, the client device may be a JAVA-enabled cellular telephone, such as the i50sx, i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In other embodiments in which the client device 480 is mobile, it may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client device 480 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif., the ViewSonic V36, manufactured by ViewSonic of Walnut, Calif., or the Toshiba PocketPC e405, manufactured by Toshiba America, Inc. of New York, N.Y. In still other embodiments the client device is a combination PDA/telephone device such as the Treo 180, Treo 270 or Treo 600, all of which are manufactured by palmOne, Inc. of Milpitas, Calif. In still further embodiment, the client device 480 is a cellular telephone that operates under control of the PocketPC operating system, such as the MPx200, manufactured by Motorola Corp.

Figure 4:
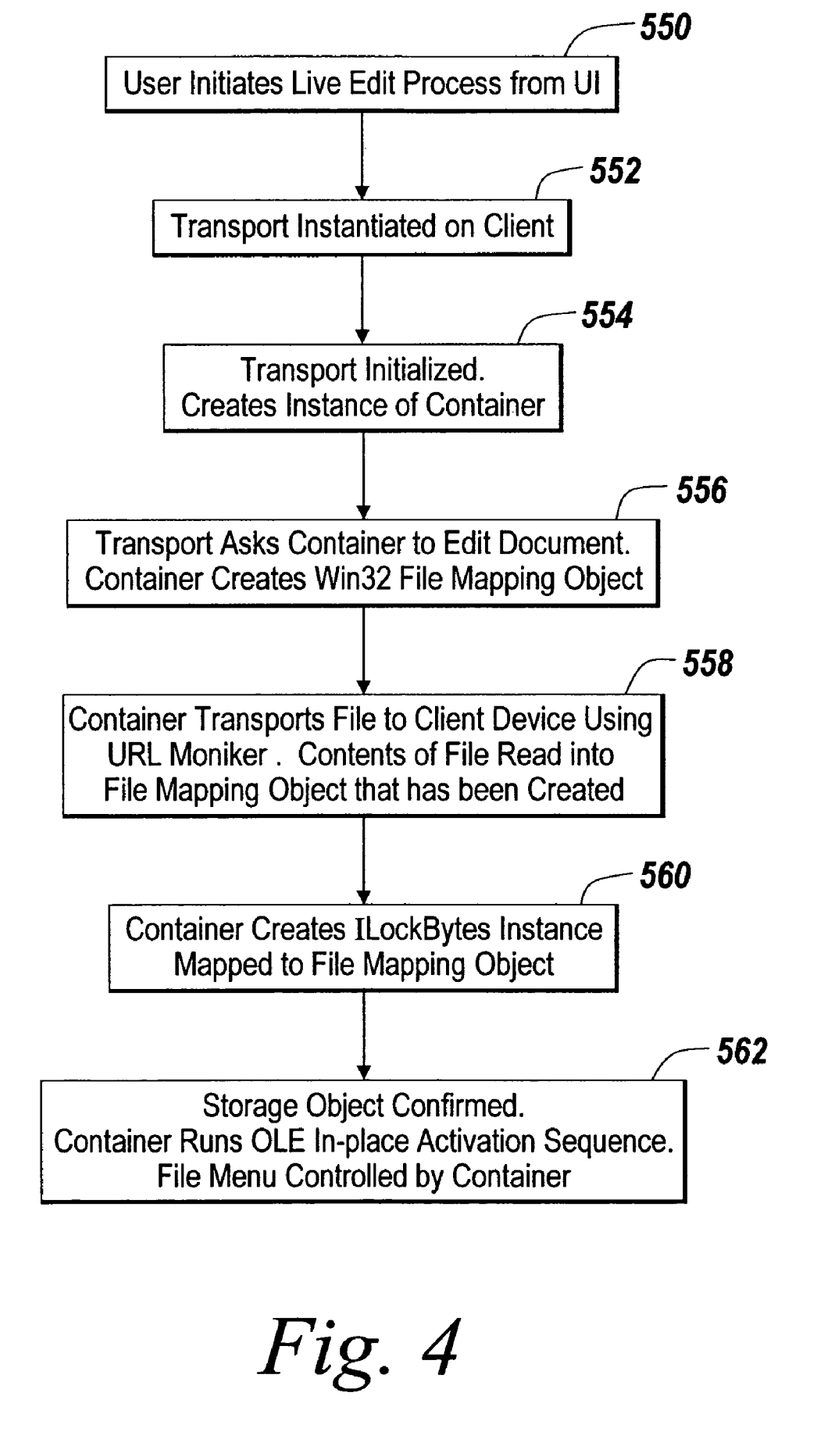
FIG. 4 is a flowchart of one embodiment of the overall sequence of steps followed by the illustrative embodiment of the present invention to securely edit downloaded content at a client device without using non-volatile memory.
Figure 5:
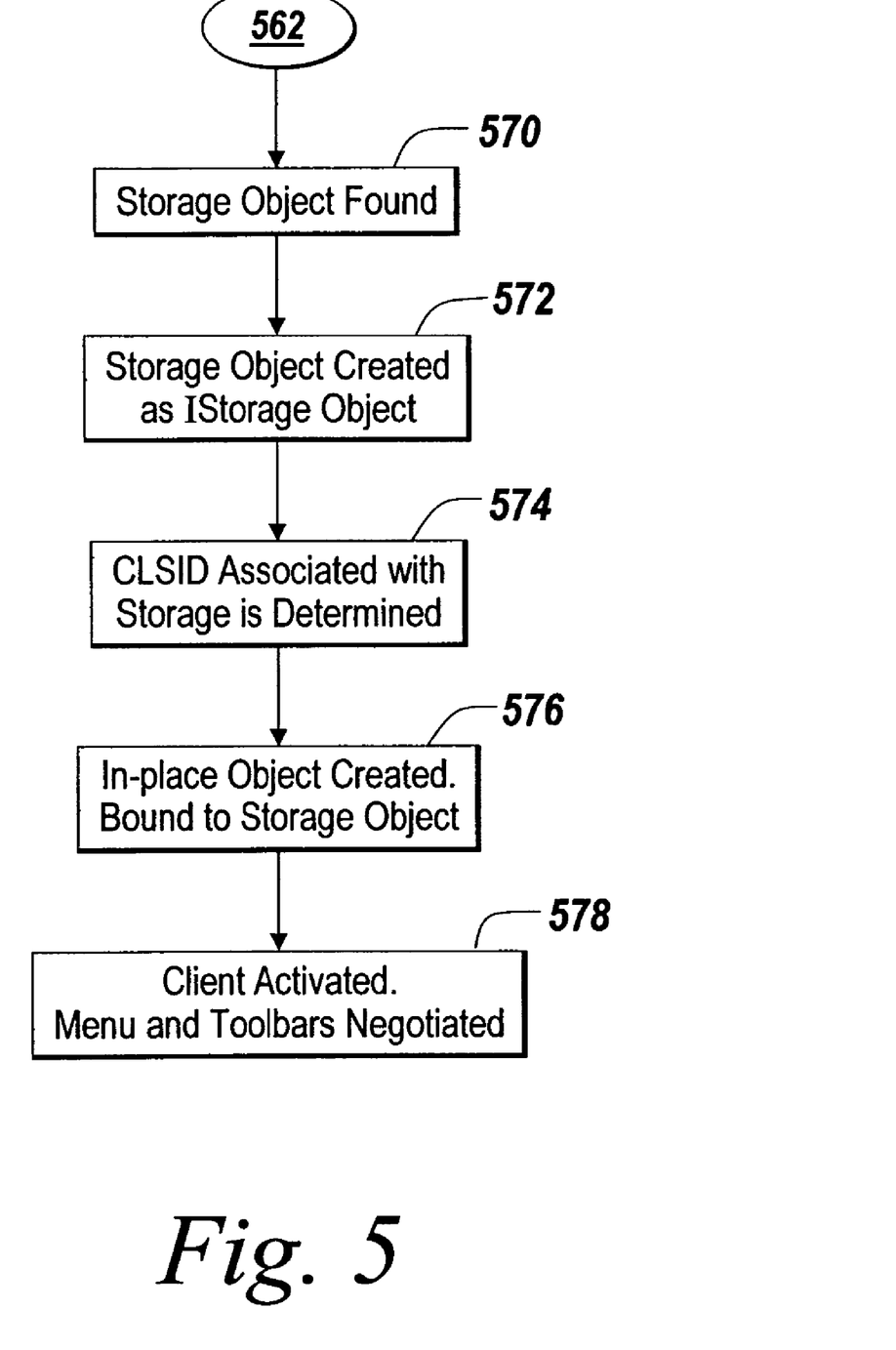
FIG. 5 is a flowchart of one embodiment of the sequence of steps followed by the illustrative embodiment of the present invention to perform OLE in-place activation in the document container.

FIG. 4 is a flowchart of one embodiment of the overall sequence of steps followed by the illustrative embodiment of the present invention to securely access content at a client device without using non-volatile memory. The sequence begins when a user at the client device initiates the specialized editing process from the user interface (step 550). This may occur automatically when the user requests any content from a specialized server or may occur through an affirmative user selection of particular content on a server. Following the selection, the transport mechanism 502 is then instantiated on the client device. In one embodiment this transport mechanism 502 is an ActiveX control object. In other embodiments, the transport mechanism may be a JAVA-based object or some other type of transport mechanism other than an Active X control object. In one implementation, the ActiveX control object is invoked by a JAVA script which passes the control parameters for the transport mechanism to the Active X control object. The transport mechanism is initialized and then creates an instance of the document container 500 on the client device 480 that will eventually receive the requested content 507, 509, 511. The document container may be an Active X/OLE (Object Linking and Embedding) container or some other type of container such as a JAVA-based container hosting a transport mechanism. The transport mechanism 502 requests the container 500 access a document and in response, the container creates a WIN32 Mapping object (step 556).

The document container 500 uses an URL moniker to transport the requested content file 507,509, 511 to the client device. An URL moniker is a system-provided moniker class that supports binding objects such as files, items and pointers to an URL. The use of the URL moniker restricts the transferred data to the current HTTPS session by binding the content file to the current session. The data from the content file is read into the newly created mapping object/global memory associated with the document container 500 (step 558). The document container then creates an interface to the mapping object, such as an IlockBytes instance mapped to the file mapping object (step 560). After the document container confirms the presence of a storage object, the document container runs an OLE in-place Activation sequence to embed an OLE-enabled application into the container where it will be used to access the content file. Examples of OLE-enabled applications include WORD, EXCEL and POWERPOINT, all from Microsoft Corporation of Redmond, Wash. (step 562). The In-Place Activation Sequence is examined in more detail during the discussion regarding FIG. 5 below. As a result of the In-Place Activation sequence, the file menu ends up being controlled by the container 500.

FIG. 5 is a flowchart of one embodiment of the sequence of steps followed to perform OLE in-place activation in the document container 500. The In-Place Activation sequence begins once the storage object is found (step 570). The storage object is then created as an IStorage object (step 572) which allows a stream to be managed within the storage object. The CLSID (class ID) associated with the storage is then determined (step 574). An In-Place Object is created and bound to the storage object (step 576). Once the client is activated, the menus and toolbars are negotiated to give control to the document container rather than the editing application (step 578). As a result of the In-Place Activation sequence the container 500 controls the file menu instead of the native application controlling the file menu.

The menu substitution performed in the container 500 may take many forms. Copy and paste functions in the application may be controlled by disabling the clipboard. Similarly, the printer functionality may be disabled. Save options may be limited to locations on the server by disabling any local save options. Client drive mapping may also be disabled. For an application such as a web browser, the cache function may be altered or turned off for certain types or all documents. Those skilled in the art will recognize that many additional forms of menu substitution and/or application function alterations may take place within the scope of the present invention.

Figure 6:
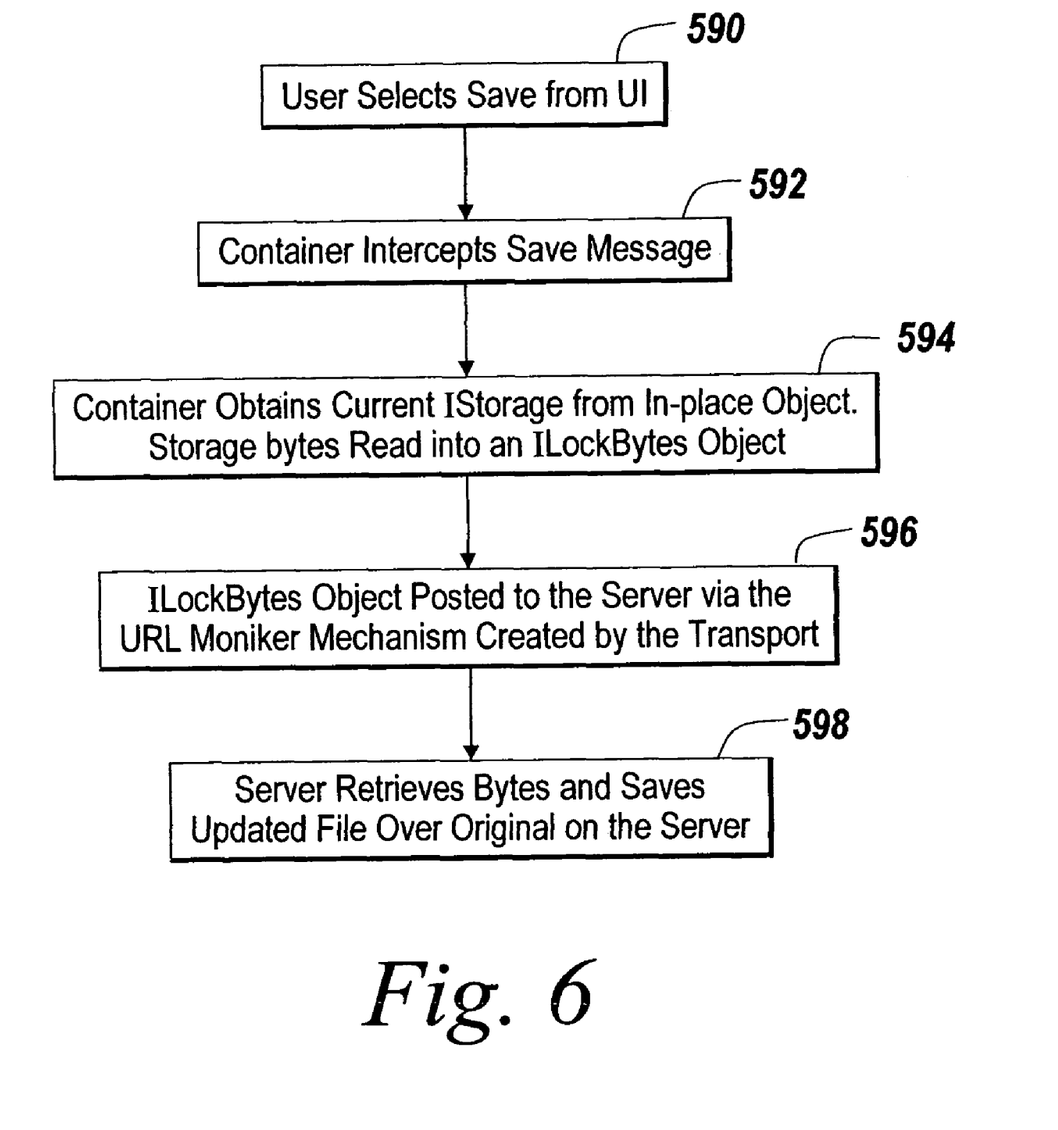
FIG. 6 is a flowchart of one embodiment of the sequence of steps followed by the illustrative embodiment of the present invention to save documents being edited in the document container.

FIG. 6 is a flowchart of one embodiment of the sequence of steps followed by the present invention to save documents being edited in the document container. The save sequence begins when the user selects "save" from the UI (step 590). To the user at the client device 480, the save operation appears to be a normal save operation. However, the document container 500 intercepts the save message (step 592). The document container 500 obtains the current IStorage from the In-Place object and the storage bytes are read into the ILockBytes Object (step 594). The ILockBytes Object is then posted to the server via the URL moniker mechanism created by the transport 502 (step 596). The server retrieves the bytes and saves the updated file over the original on the server (step 598).

Figure 7:
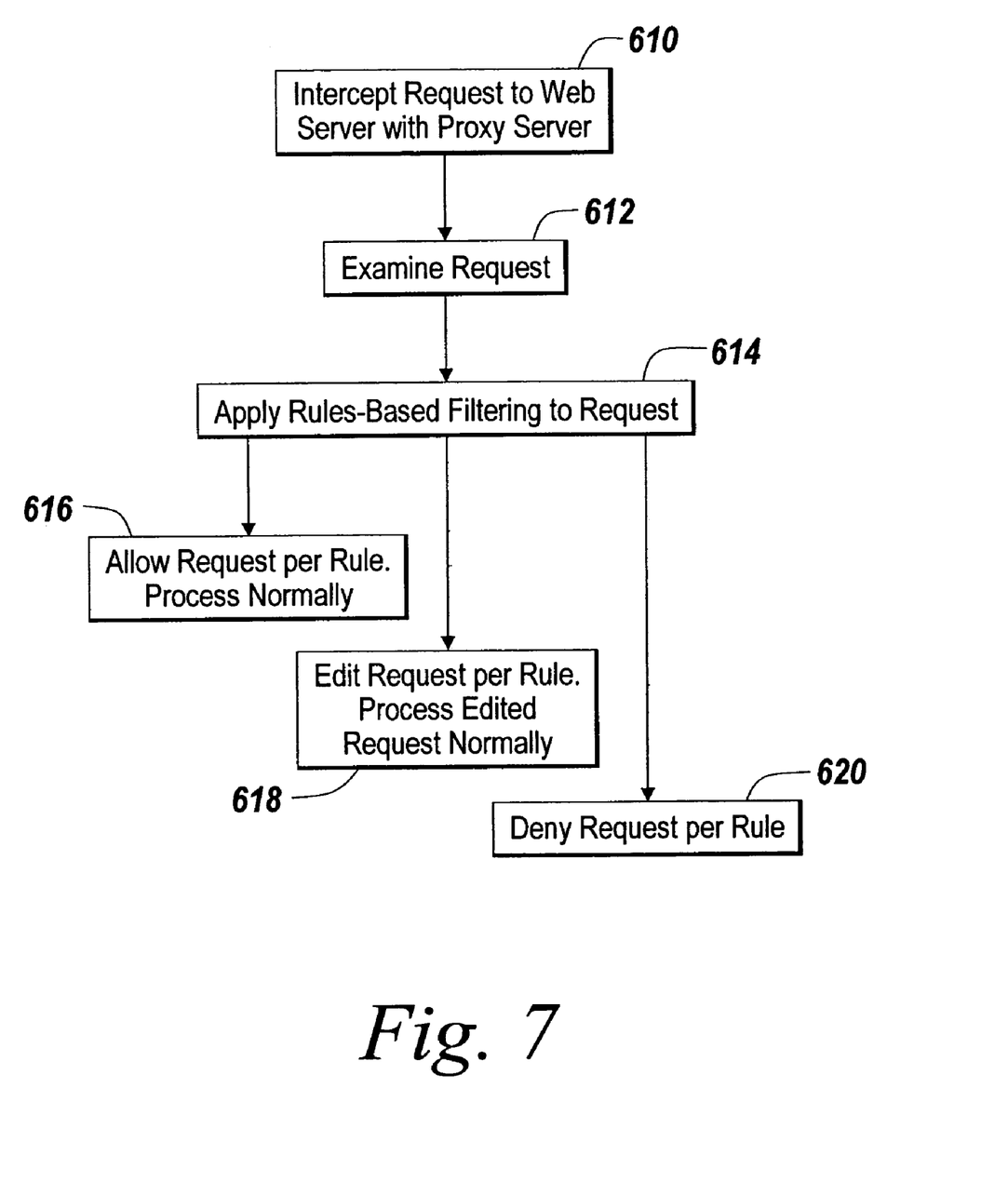
FIG. 7 is a flowchart of one embodiment of the sequence of steps followed by the illustrative embodiment of the present invention to filter document requests coming from the client device.

As noted above, a filtering mechanism may also be deployed to further restrict the content accessible to the document container. FIG. 7 is a flowchart of the sequence of steps followed by one embodiment of the present invention to filter document requests coming from the client device. The sequence begins with interception of a content request to the web server by a process running on a proxy server 520 (step 610). The request is examined (step 612) and previously determined rules are applied to the request (step 614). Following the application of the rules, the request may be processed normally with no alteration (step 616), the request may be modified based on a rule and then processed normally (step 618), or the request may be denied based upon the application of a rule (step 620). The filtering of the request may be done at the proxy server when the request is inbound or may be done by examining the responsive content being sent by the file server in an outbound direction.

The rules may filter the request for a content file based on a user profile leveraging information collected from a user at login. For example, the rules may filter the request for a content file based upon the type or amount of content requested and the job title of the requesting user. A program developer may have access to content files that a data entry clerk will not. The content files may be categorized and the availability of the content files may be restricted by the rules based on category. The rules may filter content based upon the type of connection established by the client with the user. For example, the display capabilities and the processing resources available to the client device may be considered in determining whether the requested content is transmitted without alteration to the client device, modified prior to transmission, or not transmitted. Similarly, the location of the requesting client may also impact whether the requested content is delivered and the form in which it is delivered. URL rewriting may be employed to redirect all of the content file requests to a specified server where the rules are applied to the request.

Technologies for providing remote access to networked resources include a variety of client/server software combinations. One of these combinations is often referred to as a "thin-client" or a "distributed application processing" system. The illustrative embodiment of the present invention may also be practiced in a thin-client environment. Similar to other distributed environments, practicing the illustrative embodiment of the present invention in a thin-client environment allows control over the distribution of the content file to the client system. In these systems, an application program is executed by a server computing device, usually referred to as the "application server," on behalf of one or more client computing devices, usually referred to as the "thin-client" or the "thin-client application." Only input to the application received from the user at the thin-client and output produced by an application executing on the application server are transmitted between the thin-client and the application server. Thin-client computing architectures are popular implementations for providing remote connectivity to applications and other system resources. Examples of such systems include: Citrix MetaFrame Presentation Server software in combination with Intelligent Computing Architecture (ICA) clients, available from Citrix Systems, Inc. of Fort Lauderdale, Fla.; X servers in combination with X Windows clients available from the X Consortium; and Microsoft Windows NT Server 4.0 Terminal Server Edition in combination with Remote Display Protocol (RDP) clients, available from Microsoft Corporation of Redmond, Wash.

Because a client in a thin-client computing architecture does not execute the application program and is required to transmit only user input to the application server and display only output of the application executing on the application server, the client device may offer limited amounts of memory, slower communication subsystems, and limited system resources without degradation in performance that is noticeable to the user. A personal computer, workstation, or other similar computing device typically provides ample system resources to execute the thin-client application and communicate with the application server.

However, more users requiring remote connectivity are using computing devices as thin-clients that do not provide sufficient memory, network resources, or proper operating system environments to function as thin-clients, such as cell phones and personal digital assistants. For example, many current cell phones provide less than 1 Megabyte of random access memory, which is generally not sufficient for execution of the thin-client application. Further, it is often useful for an embedded system to access an application server for application output. Typically, these systems are also limited in resources such as memory.

In one embodiment of the present invention, the document container and transport mechanism are created on a client device with constrained resources. In such a case, the applications used to access the content file are executed from a remote location rather being executed on the client device. The output from the remotely executing application may then be downloaded to the document container on the client device so that it is not permanently stored on the client device. Those skilled in the art will recognize that remote applications may be executed on the server providing the content or may be executed from a different location.

Figure 8:
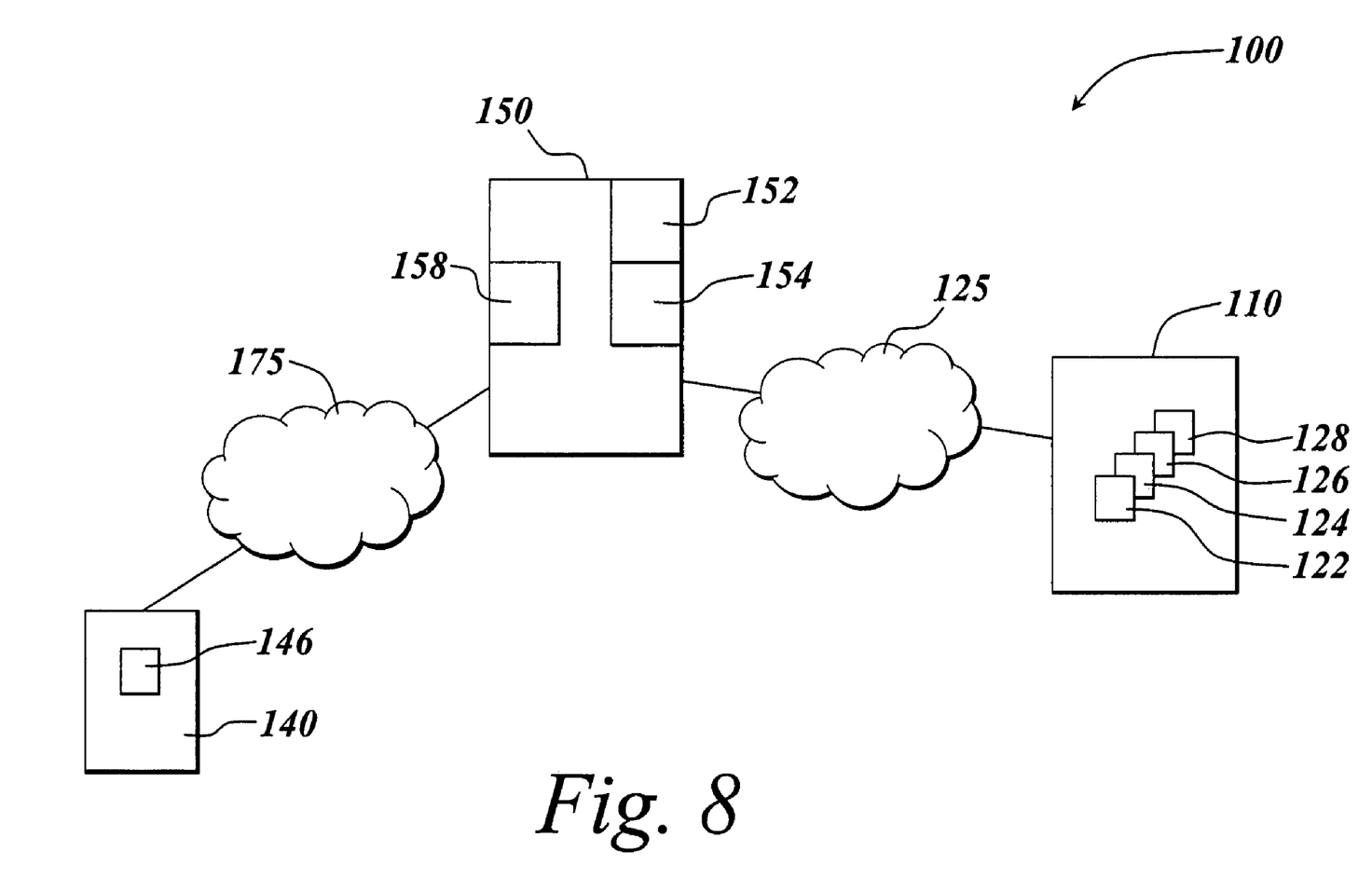
FIG. 8 is a block diagram of one embodiment of a system for providing application output to devices having constrained system resources.

Referring now to FIG. 8, a system 100 for securely providing application output to a client device having constrained system resources includes an application server 110, a proxy server 150, and a client 140. Although only one application server 110, proxy server 150, and client 140 is depicted in the embodiment shown in FIG. 8, it should be understood that the system may provide multiple ones of any or each of those components. For example, in one embodiment, the system 100 includes multiple, logically-grouped application servers 110, each of which are available to execute applications on behalf of a client 140. In these embodiments, the logical group of servers may be referred to as a "server farm." In other embodiments, multiple proxy servers 150 may be provided. In some of these embodiments, the proxy servers may be geographically dispersed.

The application server 110 communicates with the proxy server 150 over a first network 125. The first network 125 can be a local area network (LAN), a metropolitan area network (MAN), or a wide area network (WAN) such as the Internet. The application server 110 and the proxy server 150 may connect to the first network 125 through a variety of connections including standard telephone lines, LAN or WAN links (e.g., T1, T3, 56 kb, X.25), broadband connections (ISDN, Frame Relay, ATM), and wireless connections. Connections between the application server 110 and the proxy server 150 may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEE 802.11b, IEEE 802.11g and direct asynchronous connections).

The proxy server 150 executes one or more thin-client applications 152, 154 such as a Remote Display Protocol client, manufactured by Microsoft Corporation or an ICA client, manufactured by Citrix Systems, Inc. of Fort Lauderdale, Fla. The application server 110 communicates the output of the application programs 122, 124, 126, 128 to thin-client applications 152, 154 executing on the proxy server 150 and receives user input directed to the application programs 122, 124, 126, 128 from the thin-client application 152, 154. The application server 110 communicates with the thin-client applications 152, 154 over network 125 using a presentation-layer protocol such as the Independent Computing Architecture (ICA) protocol, available from Citrix Systems, Inc. of Fort Lauderdale, Fla. or the Remote Display Protocol (RDP), available from Microsoft Corporation. Although only two thin-client applications are depicted in the embodiment shown in FIG. 8, the proxy server 150 may host any number of thin-client applications 152, 154.

The proxy server 150 also executes a proxy server application 158. The proxy server application 158 may be an application program, a subsystem or a service. The proxy server application 158 manages the thin-client applications 152, 154 hosted by the proxy server 150. The proxy server application also transmits application output received by the thin-client applications 152, 154 to the client device 140 and transmits user input received from the client device 140 to the appropriate thin-client application 152, 154 executing on the proxy server 150.

The proxy server application 158 executing on the proxy server 150 communicates with the client 140 over a second network 175. For embodiments in which the client 140 is an embedded system, the client 140 and the proxy server 150 may connect to the second network 175 through a variety of connections including standard telephone lines, LAN or WAN links (e.g., T1, T3, 56 kb, X.25), broadband connections (ISDN, Frame Relay, ATM), and wireless connections. Connections between the client 140 and the proxy server 150 may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEE 802.11b, IEEE 802.11g and direct asynchronous connections).

In other embodiments, the client device 140 is a mobile device, such as a cellular telephone or a personal digital assistant. In these embodiments, the client 140 and the proxy server application 158 connect to the second network using any one of a number of well-known protocols from the GSM or CDMA families, such as W-CDMA. These protocols support commercial wireless communication services and W-CDMA, in particular, is the underlying protocol supporting i-Mode and mMode services, offered by NTT DoCoMo.

The client device 140 executes a client application 146. The client application transmits and receives http or https requests to and from the proxy server application 158. The client application 148 transmits user input directed to an executing application program 122, 124, 126, 128 to the proxy server application 158 over the second network 175. It is also responsible for rendering graphical output on the screen of the client device corresponding to the output of the application program 122, 124, 126, 128 executing on the application server 110.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

We claim:

1. A method for securely providing access to a content file, the method comprising:
   (a) requesting, by a user via a client device, access to a content file;
   (b) creating, by a transport mechanism executing on the client device, a document container on the client device;
   (c) receiving, by the document container from a server, the content file;
   (d) storing, by a storage buffer on the client device, the received content file in a volatile memory element;
   (e) invoking, by the document container, an application program associated with the content file, the application program providing a set of menu commands for interacting with the application program; and
   (f) generating, by the document container, a replacement set of menu commands comprising a subset of the set of menu commands provided by the application program.

2. The method of claim 1 wherein step (a) further comprises requesting access to a content file using an URL moniker.

3. The method of claim 1 further comprising creating a storage location in a volatile memory element.

4. The method of claim 1 further comprising instantiating a transport mechanism.

5. The method of claim 4 further comprising
   invoking an application program, associated with the content file, for execution within the document container.

6. The method of claim 1 further comprising receiving a command to save the content file; and transmitting the content file to the server.

7. The method of claim 6 further comprising releasing the memory associated with the content file in the volatile memory element.

8. A method for securely providing access to a content file, the method comprising the steps of:
   (a) requesting, by a user via a client device, access to a content file;
   (b) filtering, by a filtering mechanism, the request by applying pre-determined rules;
   (c) creating, by a transport mechanism executing on the client device, a document container on the client device;
   (d) receiving, by the document container from a server, the content file following said filtering;
   (e) storing, by a storage buffer on the client device, the received content file in a volatile memory element;
   (f) invoking, by the document container, an application program associated with the content file, the application program providing a set of menu commands for interacting with the application program; and
   (g) generating, by the document container, a replacement set of menu commands comprising a subset of the set of menu commands provided by the application program.

9. The method of claim 8 wherein, said rules are applied based upon a profile of a requesting user.

10. The method of claim 8 wherein said rules are applied based upon a category of the content file requested.

11. The method of claim 8 wherein said filtering takes place before the request is forwarded to the server.

12. The method of claim 8 wherein said filtering takes place after the request is for the server.

13. The method of claim 8 further comprising modifying said request based on said rules.

14. The method of claim 13 further comprising restricting the at least one of the type and amount of the content requested.

15. An article of manufacture having embodied thereon computer-readable program means for securely providing access to a content file, the article of manufacture comprising:
   (a) computer-readable program means for requesting, by a user via a client device, access to a content file;
   (b) computer-readable program means for creating, by a transport mechanism executing on the client device, a document container on the client device;
   (c) computer-readable program means for receiving, by the document container from a server, the content file;
   (d) computer-readable program means for storing, by a storage buffer on the client device, the received content file in a volatile memory element;
   (e) computer-readable program means for invoking, by the document container, an application program associated with the content file, the application program providing a set of menu commands for interacting with the application program; and
   (f) computer-readable program means for generating, by the document container, a replacement set of menu commands comprising a subset of the set of menu commands provided by the application program.

16. The article of manufacture of claim 15 wherein the computer-readable program means of step (a) further comprises requesting access to a content file using an URL moniker.

17. The article of manufacture of claim 15 further comprising: computer-readable program means for creating a storage location in a volatile memory element.

18. The article of manufacture of claim 15 further comprising: computer-readable program means for instantiating a transport mechanism.

19. The article of manufacture of claim 16 further comprising computer-readable program means for invoking an application program, associated with the content file, for execution within the document container.

20. The article of manufacture of claim 15 further comprising: computer-readable program means for receiving a command to save the content file; and computer-readable program means for transmitting the content file to the server.

21. The article of manufacture of claim 20 further comprising: computer-readable program means for releasing the memory associated with the content file in the volatile memory element.

22. A system for securely providing access to a content file, the system comprising:
   a server for processing a request for access to a content file;
   a client device that receives, from the server, the requested content file, the client device containing a volatile memory element;
   a file transport mechanism on the client device;
   a storage buffer, created by the transport mechanism in the volatile memory element, the storage buffer storing the received content file;
   a document container, created by the transport mechanism on the client device, that provides a context for invoking an application program associated with the content file, the application program providing a set of menu commands for interacting with the application program, the document container further providing a replacement set of menu commands comprising a subset of the set of menu commands provided by the application program.

23. The system of claim 22 wherein the document container further comprises a container instance created by the transport mechanism, and the application program executes within the created container instance.

24. The system of claim 22 wherein the client device saves the content file, and transmits the content file to the server.

25. The system of claim 24 wherein the client device deletes the content file.

* * * * *